INTEGRATION CIRCUIT

Filed Oct. 24, 1952

$E_C = \mu\ (E_A - E_B) \quad \mu \gg 1$ $$E_B = \frac{E_H + E_J}{2} \qquad E_A = \frac{E_G}{2}$$

$$E_C = E_J = -\mu\left(\frac{E_H + E_J}{2} - \frac{E_G}{2}\right)$$

$$E_J = \frac{\mu}{\mu + 2}\,(E_G - E_H) \longrightarrow E_G - E_H$$

$$E_G = -\frac{1}{R_2 C_2}\int E_H \cdot dt$$

INVENTOR.
OMAR L. PATTERSON
BY
Busser, Smith & Harding
ATTORNEYS

United States Patent Office 2,779,872

Patented Jan. 29, 1957

2,779,872

INTEGRATION CIRCUIT

Omar L. Patterson, Media, Pa., assignor to Sun Oil Company, Philadelphia, Pa., a corporation of New Jersey Application October 24, 1952, Serial No. 316,663

8 Claims. (Cl. 250—27)

This invention relates to computing circuits and has particular reference to an integration circuit.

This application is in part a continuation of my application Serial No. 239,279, filed July 30, 1951. Reference may also be made to my prior applications Serial Nos. 130,270 (now Patent No. 2,727,682, granted December 20, 1955) and 196,480, filed respectively November 30, 1949, and November 18, 1950.

Electronic computing circuits are frequently only approximate in their computing functions and, in particular, are usually sensitive to voltage variations and changes in characteristics of component elements, particularly thermionic tubes. Accordingly, using circuits heretofore known, computations could be carried out to only a very limited degree of accuracy.

The present invention provides, in particular, an integration circuit of high accuracy and very substantial independence of tube characteristics. Furthermore, the integration circuit has a high input impedance despite low values of the integrating time constant RC. The integration circuit also provides an output which contains only the integral term, there being absent additional terms such as have usually been involved in integration circuits.

As will appear hereafter, there is provided as an element of the integration circuit a high gain differential amplifier which is particularly responsible for the accuracy of the computations involved and their independence of tube characteristics.

The primary object of the present invention is the provision of an improved integration circuit having the characteristics above indicated. This object as well as other objects, particularly relating to details of construction and operation, will become apparent from the following description read in conjunction with the accompanying drawing, in which.

The differential amplifier which is preferably employed will now be described, it being understood that other types of differential amplifiers may be used.

Figure 1:
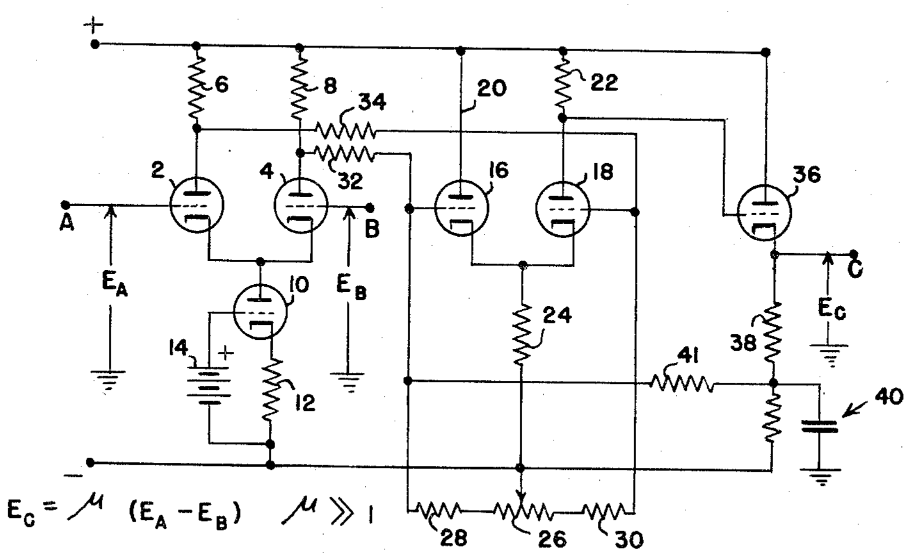
Figure 1 is a wiring diagram of a high gain differential amplifier forming an element of the integration circuit.

A preferred form of high gain differential amplifier is illustrated in Figure 1 and is of the type described in "Vacuum Tube Amplifiers," volume 18, Radiation Laboratory Series, page 485, McGraw-Hill, 1948. It will be noted that this differential amplifier is, in many respects, similar to that disclosed in my application, Serial No. 196,480. It involves an improvement thereover in the provision of a constant current triode.

A pair of triodes 2 and 4 have their grids connected to the input terminals A and B. These triodes are provided with anode load resistors 6 and 8 and their cathodes are connected together and to the anode of a triode

10 arranged in a cathode follower circuit, there being provided the cathode load resistor 12. A battery 14 or other source of fixed potential is connected between the remote end of the cathode resistor 12 and the grid of triode 10.

The grids of a pair of triodes 16 and 18 are respectively connected through resistances 32 and 34 to the anodes of triodes 4 and 2. The anode of triode 16 is connected directly to the positive potential supply line. The anode of triode 18 is connected to the same supply line through a load resistor 22. The cathodes of triodes 16 and 18 are connected to each other and to a common cathode load resistor 24 which is, in turn, connected to a negative potential supply line. To this line there is also connected the contact of a potentiometer 26 which is connected respectively through resistances 28 and 30 to the grids of triodes 16 and 18. An output triode 36 is connected in a cathode follower circuit, its cathode being connected to the negative potential supply line through a resistor 38 and a resistance-capacitance network indicated at 40. Feedback is provided through resistance 41 to the grid of triode 16. The grid of triode 36 is connected to the anode of triode 18 and the anode of triode 36 is connected to the positive potential supply line. The output terminal C is connected to the cathode of triode 36.

With a balancing adjustment properly made at potentiometer 26, the action of this differential amplifier is to provide at the output terminal C a potential $E_C$ which is related to the input potentials at terminals A and B, namely $E_A$ and $E_B$ in accordance with the expression given below the circuit diagram in Figure 1. By virtue of the amplification which is provided in the circuit, the constant $\mu$ has a value greatly exceeding unity and, in fact, with a proper choice of circuit constants, this factor may have a value as high as 10,000.

In the case of the differential amplifier circuit illustrated and described in said Patterson application, Serial No. 196,480, the cathodes of the triodes corresponding to 2 and 4 are connected to the negative supply line through a resistor. When such a connection is made, the expression for $E_C$ contains an additional term involving the sum of the potentials $E_A$ and $E_B$. This common mode of these potentials is substantially completely eliminated by the provision of the triode 10 and its connections in place of a fixed resistance, the action of this triode being to provide a constant total current from the cathodes of triodes 2 and 4. As will be evident, this constant current condition results from the fact that the cathode potential of triode 10 with respect to the lower end of resistor 12 is maintained substantially constant by the provision of the battery 14, the positive terminal of which is connected to the grid of triode 10. It will be evident, therefore, that if the triodes 2 and 4 are similar in their characteristics, as they desirably should be, a simultaneous change of potential of the grids of both in the same sense and amount will result in no change of the currents through the load resistors 6 and 8 and, consequently, no output signals to the grids of the triodes 16 and 18. When, therefore, the triodes 2 and 4 are similar to each other and the triodes 16 and 18 are also similar to each other, and minor differences are subjected to substantial elimination by adjustment at potentiometer 26, the expression given below the circuit diagram holds to a high degree of accuracy and the output potential is extremely sensitive to differences between the input potentials. As will appear hereafter, this condition may be utilized in securing a high precision of equality between various potentials, in view of the high value of the factor $\mu$. The high numerical value of this factor may be also utilized to secure ratios, as will appear hereafter, which are very nearly equal to unity.

A highly important feature of the differential amplifier as a basic computer element, especially for long time operation, is mutual cancellation of effects of heater voltage variation and "aging" of tube characteristics.

The differential amplifier of the type above described is incorporated in a subtraction circuit which is desirably used in the integrator though it will be apparent that other subtraction circuits may be used. The subtraction circuit about to be described, however, is preferred since it may provide a high input impedance for the potential representative of the function to be integrated.

Figure 2:
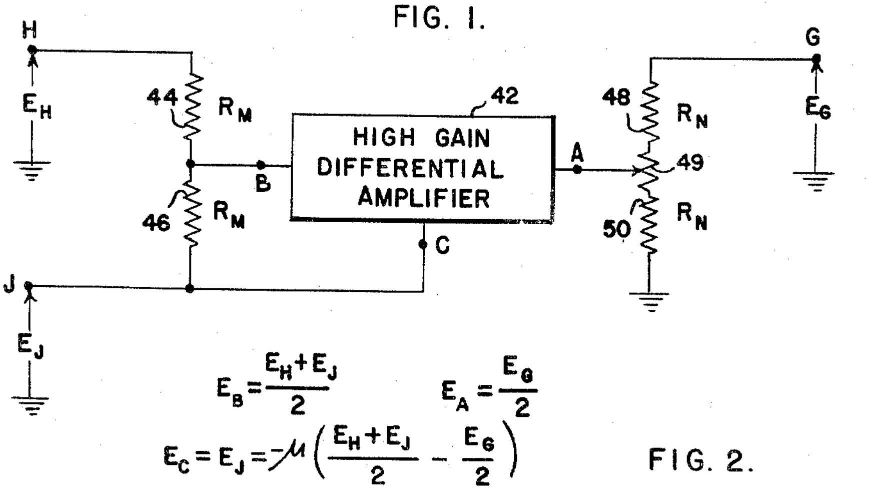
Figure 2 is a diagram showing a high accuracy subtraction circuit involving the use of the high gain differential amplifier of Figure 1.

In this subtraction circuit the high gain differential amplifier of Figure 1 is indicated at 42, its terminals, A, B and C being indicated in Figure 2 to correspond with those in Figure 1. The terminal B is connected to the junction of a pair of resistors 44 and 46 which initially may be considered to have the same resistance value $R_M$. The terminal A is similarly connected to the adjustable contact of a potentiometer 49 provided between a pair of resistors 48 and 50 which, with the potentiometer, may be assumed to provide between terminal B and a terminal G and between terminal B and ground a pair of resistances having approximately the same resistance value $R_N$. The upper end of resistors 44 is connected ot a terminal H, while the lower end of resistor 44 is connected both to the terminal C and an output terminal J. Terminals G and H constitute input terminals for the subtraction circuit. That the output potential $E_J$ appearing at terminal J is very precisely equal to the difference of the input potentials $E_G$ and $H_H$ appearing at terminals G and H will be evident from consideration of the expressions given below the circuit diagram in Figure 2. When the value of $\mu$ is very large, as previously described, it will be evident that the fractional factor involved in the last line of the expressions is very nearly equal to unity. Accordingly, an output potential is provided which is substantially equal to the difference of the input potentials. It will be evident that, even though the value of $\mu$ may vary from one high gain differential amplifier to another, or during the use of an amplifier because of changes in tube characteristics, the subtraction circuit output is highly independent of any such variations of operating characteristics of the differential amplifier. The circuit is also capable of handling a very wide range of both positive and negative potentials.

In particular, it is to be noted that this subtraction circuit does not involve any additive term derived from tube potentials or other source as do subtraction circuits heretofore known. This fact is particularly important in uses of the subtraction circuit for integration or differentiation.

The subtraction circuit described above forms the subject-matter of my copending application, Serial No. 316,173, filed October 22, 1952.

Figure 3:
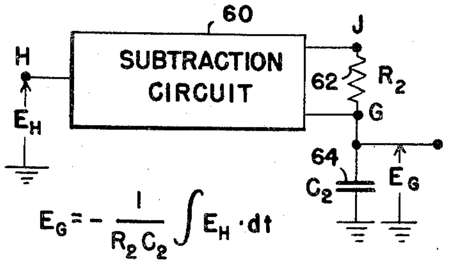
Figure 3 is a wiring diagram of the improved integration circuit.

Figure 3 illustrates the improved integration circuit in which the subtraction circuit of Figure 2 is provided at 60 and terminals G and J are connected by a resistance 62 while terminal G is connected through condenser 64 to ground. Consideration of the circuit of Figure 3 will reveal that there will appear a potential $E_G$ at the output terminal given essentially by the expression below the circuit diagram in Figure 3. If a constant of integration is required (as is usual) a potential source may be interposed in the output circuit in various fashions.

A high accuracy of integration by the circuit of Figure 3 is provided and it will, accordingly, be evident that an accurate linear sweep generator may be secured if at terminal H there is applied a constant potential $E_H$. The linearity of the sweep thus provided is much more precise than provided by so-called linear sweep generators heretofore known. The integration circuit is quite independent of tube characteristics and voltage supply variations. It has high stability of direct potential level and, consequently, may perform long time integrations, unattainable by feedback type or Miller integrators.

It will be noted that the expression below the circuit diagram in Figure 3 contains on its right-hand side only a single integration term. Usually in integrators heretofore provided there are inevitably obtained additional terms which may be either constant or variable but which are in any event usually undesirable. The improved circuit involves complete elimination of such terms, subject, of course, to a high value of the effective amplification factor of the differential amplifier.

Inasmuch as the resistances $R_M$ of the subtraction circuit shown in Figure 2 may be very large, and since the connection of terminal H to any low impedance network is only through such resistances, it will be evident that the input impedance may be very high despite a low RC constant of the integration.

It should be noted that the equation given below the circuit diagram in Figure 3 is strictly correct only if the value of $R_N$ is sufficiently large so that it draws negligible current. Where highly precise results are required the effects of the current through resistors $R_N$, and also any leakage in condenser $C_2$, may be exactly compensated by appropriate choice of the ratio between the values of resistors $R_{44}$ and $R_{46}$ or resistors $R_{48}$ and $R_{50}$. The latter is preferred since it will not result in a change in the rate of integration. Consequently, if a potentiometer 49 is connected between $R_{48}$ and $R_{50}$, with the point B taken from the sliding contact, then highly precise integration is secured by appropriate adjustment of the potentiometer. The resistances presented at $R_N$ will be approximately equal whenever $R_N$ is large.

What is claimed is:

1. An integrating circuit comprising a subtraction circuit having first and second input terminals and a third output terminal and operative to produce between said third terminal and a terminal common to said inputs and said output a potential approximately equal to the difference of potential between the first terminal and the second terminal, a resistance between the first and third terminals, and a condenser connected between the first terminal and said common terminal.

2. An integrating circuit comprising a subtraction circuit having first and second input terminals and a third output terminal and operative to produce between said third terminal and a terminal common to said inputs and said output a potential approximately equal to the difference of potential between the first terminal and the second terminal, a resistance between the first and third terminals, and a condenser connected between the first terminal and said common terminal, said subtraction circuit comprising a differential amplifier having two input terminals and an output terminal, a pair of connected impedances having their junction connected to one of the last mentioned input terminals, a second pair of connected impedances having their junction connected to the other of the last mentioned input terminals, and a connection between the end of one of said impedances and the last mentioned output terminal.

3. An integrating circuit comprising a subtraction circuit having first and second input terminals and a third output terminal and operative to produce between said third terminal and a terminal common to said inputs and said output a potential approximately equal to the difference of potential between the first terminal and the second terminal, a resistance between the first and third terminals, and a condenser connected between the first terminal and said common terminal, said subtraction circuit comprising a differential amplifier having two input terminals and an output terminal, a pair of connected equal impedances having their junction connected to one of the last mentioned input terminals, a second pair of connected equal impedances having their junction connected to the other of the last mentioned input terminals, and a connection between the end of one of said impedances and the last mentioned output terminal.

4. An integrating circuit comprising a subtraction circuit having first and second input terminals and a third output terminal and operative to produce between said third terminal and a terminal common to said inputs and said output a potential approximately equal to the difference of potential between the first terminal and the second terminal, a resistance between the first and third terminals, and a condenser connected between the first terminal and second common terminal, said subtraction circuit comprising a differential amplifier having two input terminals and an output terminal, a pair of connected resistances having their junction connected to one of the last mentioned input terminals, a second pair of connected resistances having their junction connected to the other of the last mentioned input terminals, and a connection between the end of one of said resistances and the last mentioned output terminal.

5. An integrating circuit comprising a subtraction circuit having first and second input terminals and a third output terminal and operative to produce between said third terminal and a terminal common to said inputs and said output a potential approximately equal to the difference of potential between the first terminal and the second terminal, a resistance between the first and third terminals, and a condenser connected between the first terminal and said common terminal, said subtraction circuit comprising a differential amplifier having two input terminals and an output terminal, a pair of connected approximately equal resistances having their junction connected to one of the last mentioned input terminals, a second pair of connected approximately equal resistances having their junction connected to the other of the last mentioned input terminals, and a connection between the end of one of said resistances and the last mentioned output terminal.

6. A circuit comprising a reference terminal, an input terminal, a second terminal, a series arrangement of a resistance and a reactance connected between said second terminal and said reference terminal, and means providing at said second terminal a potential relative to said reference terminal which is the difference between the potential of the junction of said resistance and reactance relative to said reference terminal and the potential of said input terminal relative to said reference terminal.

7. A circuit according to claim 6 in which said reactance is a capacitance.

8. A circuit according to claim 7 in which said capacitance is the element of said series arrangement which is connected to said reference terminal, whereby there is provided at said junction a potential relative to said reference terminal which is a time integral of the potential of said input terminal relative to said reference terminal.

References Cited in the file of this patent

UNITED STATES PATENTS

| | | |
|---|---|---|
| 2,251,973 | Beale et al. | Aug. 12, 1941 |
| 2,463,553 | Olesen | Mar. 8, 1949 |
| 2,567,532 | Stephenson | Sept. 11, 1951 |
| 2,583,587 | Milsom | Jan. 29, 1952 |
| 2,682,607 | Schmitt et al. | June 29, 1954 |

OTHER REFERENCES

Waveforms by Chance et al.: Vol. 19, Radiation Laboratory Series, pages 360–361 and 642–643, McGraw-Hill Publishing Co., Inc., New York, 1949.

"Designing an Office Size Electronic Analog Computer" by McCoy et al.; from Electrical Manufacturing, April 1951, pp. 94–99, 230–234.